United States Patent [19]

Dalebout

[11] Patent Number: 5,203,826
[45] Date of Patent: Apr. 20, 1993

[54] ENCLOSED FLYWHEEL

[75] Inventor: William T. Dalebout, Logan, Utah

[73] Assignee: Proform Fitness Products, Inc., Logan, Utah

[21] Appl. No.: 896,894

[22] Filed: Jun. 10, 1992

Related U.S. Application Data

[63] Continuation of Ser. No. 776,723, Oct. 15, 1991, abandoned, which is a continuation of Ser. No. 481,352, Feb. 16, 1990.

[51] Int. Cl.$^5$ .................. G05G 1/00; F16H 55/36; B63H 1/00
[52] U.S. Cl. .................... 74/572; 74/573 R; 474/174; 482/63; 416/247 R; 416/247 A
[58] Field of Search ................. 74/572-574; 416/247 R, 247 A; 482/64, 57, 59, 63; 474/167, 168, 174 X; D21/191-199

[56] References Cited

U.S. PATENT DOCUMENTS

| | | | |
|---|---|---|---|
| 182,322 | 9/1876 | Norcross | 474/174 |
| D. 275,589 | 9/1984 | Gustafsson | D21/194 |
| D. 280,923 | 10/1985 | Smith et al. | D21/194 |
| D. 281,520 | 11/1985 | Kiiski | D21/194 |
| D. 282,191 | 1/1986 | Bell et al. | D21/194 |
| D. 283,431 | 4/1986 | Gustafsson | D21/194 |
| D. 285,816 | 9/1986 | Berntsson | D21/194 |
| D. 286,665 | 11/1986 | Kelley | D21/194 |
| 306,330 | 2/1990 | Lucas et al. | D21/194 |
| 307,167 | 4/1990 | Lucas et al. | D21/194 |
| 319,274 | 8/1991 | Byrd et al. | D21/194 |
| 1,289,561 | 12/1918 | Sibbett | 474/174 |
| 2,847,114 | 8/1958 | Orr | 474/167 |
| 2,925,739 | 2/1960 | Urquhart et al. | 474/174 |
| 2,987,242 | 6/1961 | Mazzacane | 416/247 |
| 3,787,142 | 1/1974 | Dupke | 416/247 R |
| 3,791,333 | 2/1974 | Losch | 416/247 |
| 4,007,927 | 2/1977 | Proctor | 272/73 |
| 4,148,478 | 4/1979 | Moyski et al. | 272/73 |
| 4,188,030 | 2/1980 | Hooper | 482/63 |
| 4,286,696 | 9/1981 | Szymski et al. | 188/218 A |
| 4,335,646 | 6/1982 | Jacquet et al. | 416/247 RX |
| 4,356,535 | 10/1982 | Chu | 416/247 RX |
| 4,456,431 | 6/1984 | Crespin | 416/247 RX |
| 4,509,742 | 4/1985 | Cones | 272/73 |
| 4,602,781 | 7/1986 | La Marsh et al. | 272/73 |
| 4,657,244 | 4/1987 | Ross | 272/73 |
| 4,657,483 | 4/1987 | Bede | 416/247 R |
| 4,680,017 | 7/1987 | Eller | 416/247 A |
| 4,712,790 | 12/1987 | Szymski | 272/73 |
| 4,724,747 | 2/1988 | Sturm et al. | 416/247 RX |
| 4,776,755 | 10/1988 | Bjorkestam et al. | 416/247 A |
| 4,818,183 | 4/1989 | Schaefer | 416/247 R |
| 4,880,225 | 11/1989 | Lucas et al. | 272/73 |
| 4,889,335 | 12/1989 | Chen | 272/73 |
| 4,977,794 | 12/1990 | Metcalf | 74/572 |
| 5,000,444 | 3/1991 | Dalebout et al. | 272/73 |

FOREIGN PATENT DOCUMENTS

| | | | |
|---|---|---|---|
| 3603854 | 8/1987 | Fed. Rep. of Germany | 272/73 |
| 0093547 | 5/1984 | Japan | 74/572 |
| 936865 | 9/1963 | United Kingdom | 416/247 |
| 89/02553 | 3/1989 | World Int. Prop. O. | 474/174 |

OTHER PUBLICATIONS

1990 Diversified Products Product Catalog.
1991 Wynmor Product Catalog.
1991 Diversified Products Product Catalog.
Schwinn Product Catalog.
Pages from J. C. Penney's Catalog.
Vitamaster Ad Slick for Airwaves Fan Cycle.
Pan's North Catalog, Pre 1985, "Pan's 3000 Bodycycle", 2 pages.

Primary Examiner—Vinh T. Luong
Attorney, Agent, or Firm—Trask, Britt & Rossa

[57] ABSTRACT

A flywheel has a hub with a plurality of blades secured to said hub and extending away therefrom. A plurality of ribs are secured to the blades to form a protective enclosure which rotates with the blades. The ribs are spaced apart a distance selected to inhibit insertion of the user's fingers thereinbetween.

14 Claims, 3 Drawing Sheets

ENCLOSED FLYWHEEL

This application is a continuation of application Ser. No. 07/776,723, filed Oct. 15, 1991, now abandoned, which is a continuation of Ser. No. 07/481,352, filed Feb. 16, 1990, now abandoned.

BACKGROUND OF THE INVENTION

1. Field

This invention relates to rotatable resistance wheels of exercise machines. More particularly, this invention relates to flywheels for use with a stationary exercise machine.

2. State of the Art

Any mechanical arrangement involving rotating blades or spokes inherently presents the danger of injury or damage to any object which might come in contact with the blades or spokes while they are turning. When wheels with blades or spokes are made a part of any device which is within the reach of people or animals, the possibility exists that clothes, fingers, toes, paws or other body parts may accidentally or intentionally come in contact with the turning blade or spoke portion. Severe injuries may result.

In the field of exercise equipment, devices exist which have a flywheel component for providing resistance. Some flywheels are constructed with blades which interact with the air to provide resistance to movement. U.S. Pat. No. 4,188,030 (Hooper) dated Feb. 12, 1980 discloses a device comparable to a Schwinn AirDyne machine in which the blades or paddles are enclosed by a stationary cage. Air resistance wheels with blades typically are arranged to rotate the wheel at a speed higher than an inertia wheel to obtain the necessary resistance. Also, the enclosure or stationary cage is typically arranged to closely surround the blades. Thus, a foreign object, including clothes items, fingers or the like, need only be inserted a short distance to come into contact with the blades and risk injury or damage to the object and to the blade.

SUMMARY OF THE INVENTION

A flywheel has a plurality of blades secured to and extending away from a hub. Enclosure means are secured to and positioned about the blades so that objects are prevented from coming in contact with the turning blades.

The enclosure means preferably includes a plurality of spaced apart ribs each radiating concentrically outwardly from and in orientation to the hub. The ribs are spaced apart from each other a distance selected to inhibit the insertion of small objects, such as fingers, through the ribs, and to thereby prevent contact with the turning blades.

BRIEF DESCRIPTION OF THE DRAWINGS

In the drawings, which illustrate what is presently regarded as the preferred embodiment.

DETAILED DESCRIPTION OF THE PREFERRED EMBODIMENTS

The invention generally provides for an enclosure means for enclosing the blades of a wheel to reduce the risk of objects being accidentally or even intentionally placed in contact with the turning blades. In general, the enclosure means includes a plurality of ribs which are secured to the blades and radiate outwardly from the hub of the wheel. The ribs of the enclosure means may be made an integral part of the blades or hub, or both.

Figure 1:
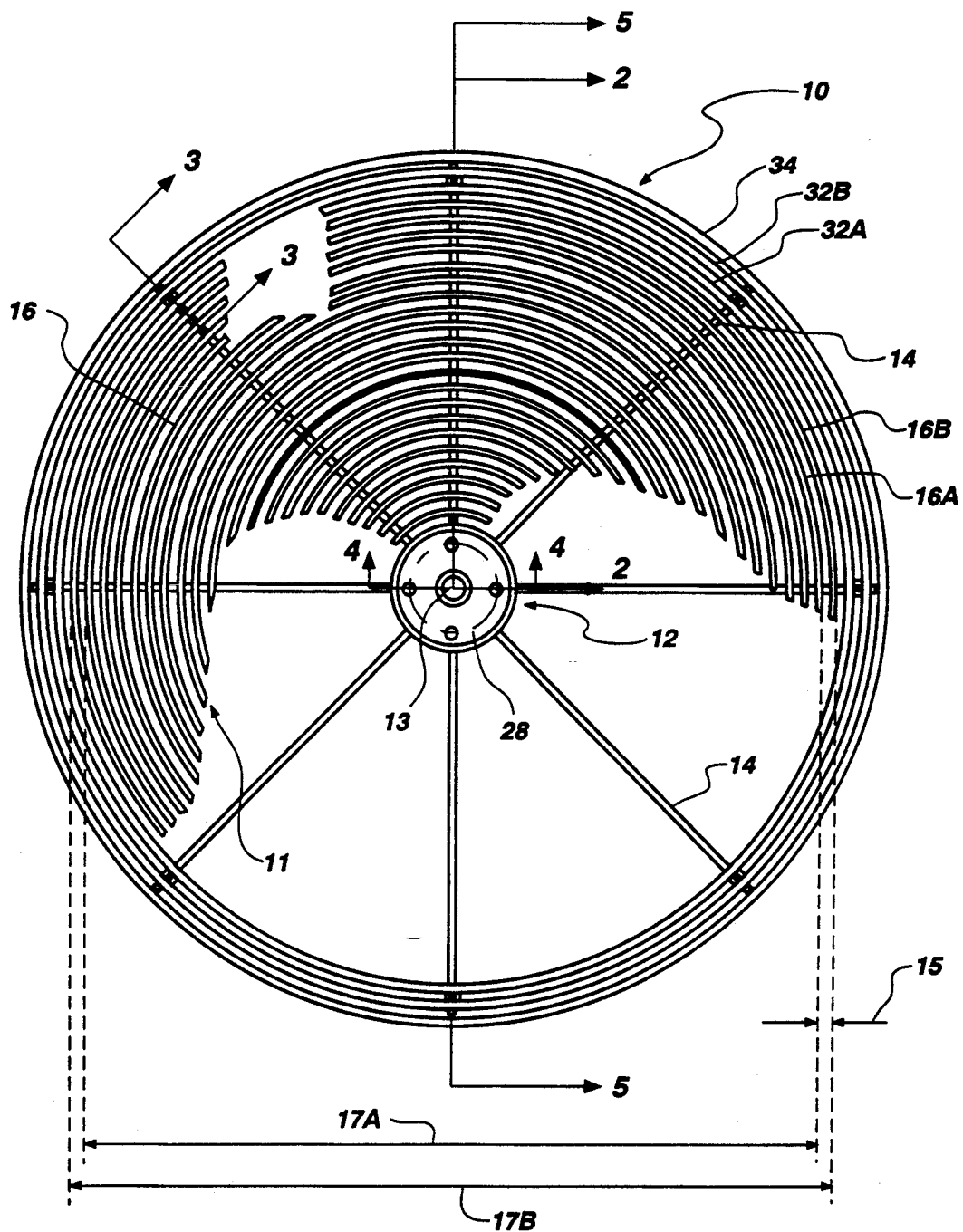
FIG. 1 is a plan view of the flywheel of the instant invention.

In FIG. 1, a flywheel is shown and is generally referred to by the number 10. The flywheel 10 has an enclosure 11 integrally attached to the hub 12 and blades 14 radiating outwardly from the hub. In FIG. 1, the blades 14 are flat so that each blade has two opposing surfaces; and each blade 14 is secured to the hub 12 to extend radially as shown. The blades 14 may be of any shape, dimension, or length, or in any orientation to the hub. They may even be pitched, like a fan or boat propeller.

The enclosure 11 includes a plurality of ribs 16 which radiate outwardly and concentrically from and with respect to the hub. The ribs may be in a spiral pattern or in any other configuration which allows air to flow in toward and out from the blades while minimizing access by clothes, body parts or other foreign objects. The ribs 16 shown are preferred because of ease of manufacture and because they minimize wheel imbalance while also reducing obstructions which may catch a body part, item of clothing or the like.

The ribs 16 are individual rings 16A, 16B of incrementally increasing diameter 17A, 17B and are spaced apart from each other a sufficient distance 15 to inhibit the insertion of foreign objects and fingers. The distance 15 between the ribs may be from about one millimeter to about one centimeter.

Figure 2:
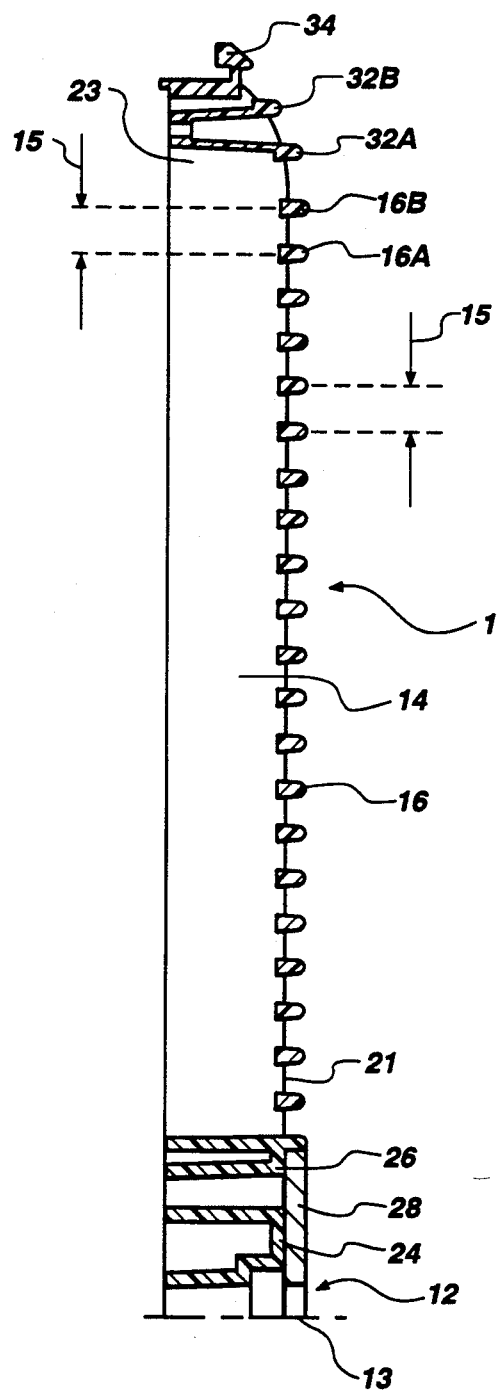
FIG. 2 is a cross-sectional view of a blade of the invention FIG. 1 taken at line 2—2.
Figure 3:
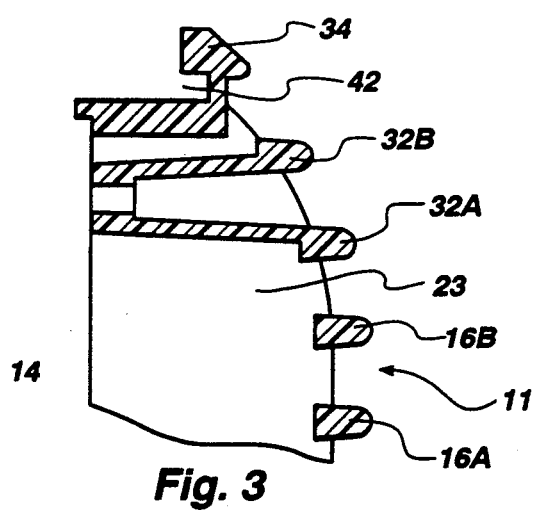
FIG. 3 is a cross-sectional view of the tip of a blade of the shown in FIG. 1 taken at line 3—3.
Figure 4:
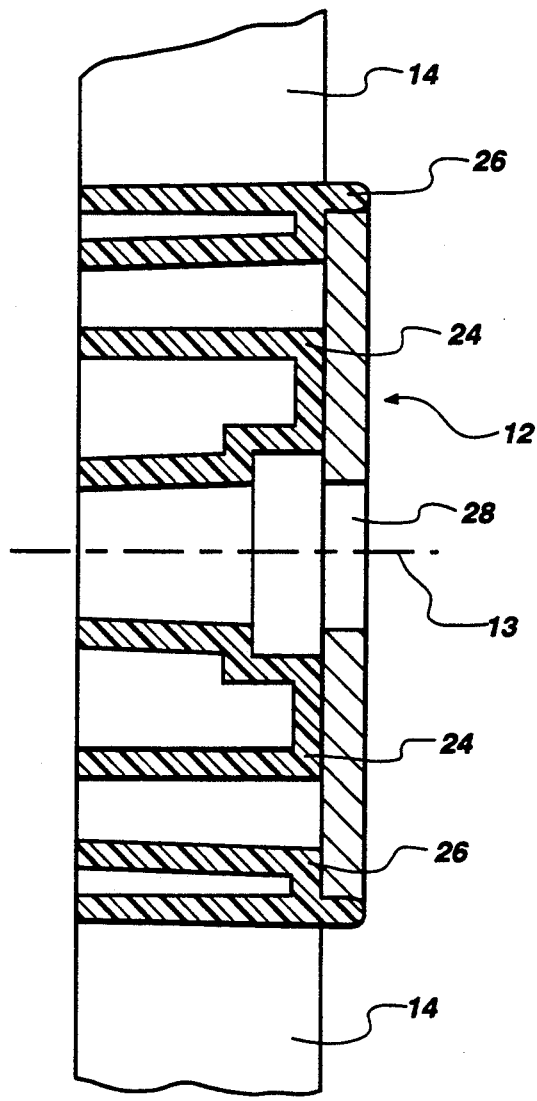
FIG. 4 is a cross-sectional view of the hub of the invention shown in FIG. 1 taken at line 4—4.
Figure 5:
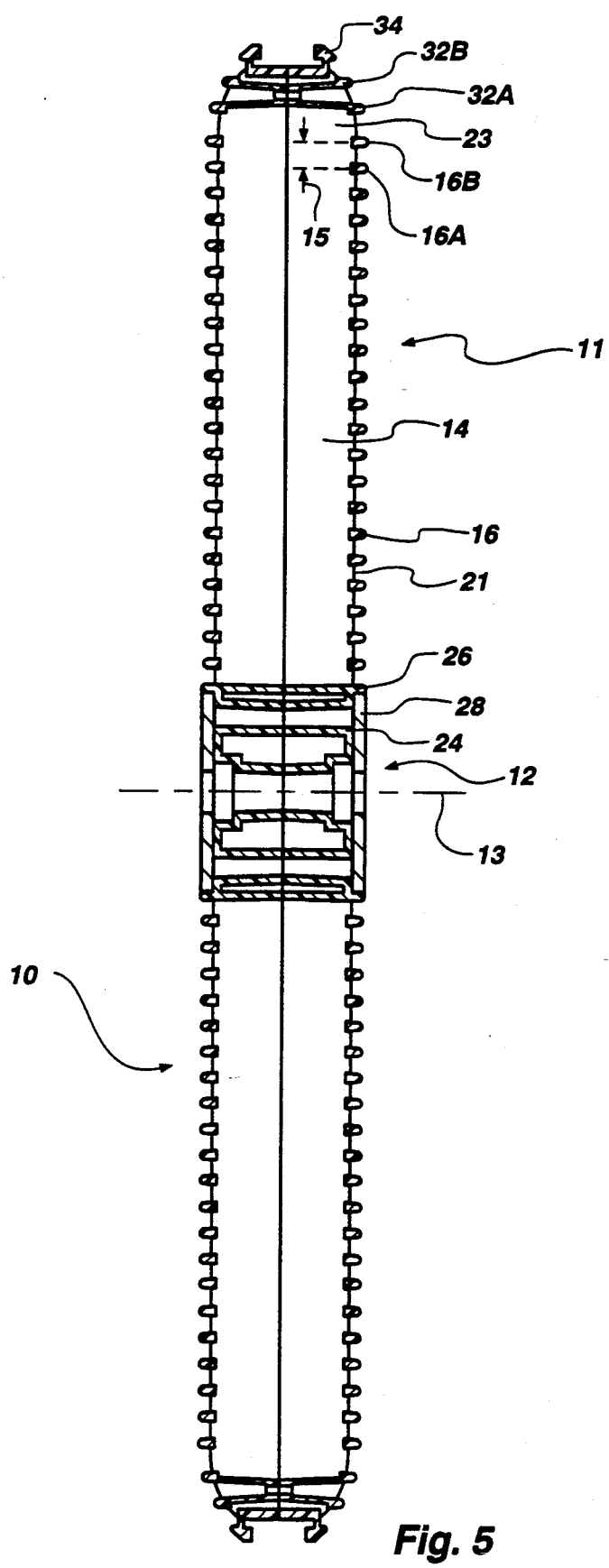
FIG. 5 is a cross-sectional view of the flywheel of the invention as shown in FIG. 1 taken at line 5—5.

The embodiment of the invention shown in FIGS. 1 through 4 may be manufactured in a variety of ways including molding and extrusion processes. FIGS. 2 through 4 show one half or two mirror image halves of the flywheel 10 which may be manufactured and subsequently joined together by appropriate means to assemble the whole wheel. Thus, separate and distinct components such as the blades, hub, and ribs need not be separately made and assembled, thereby reducing costs.

FIG. 2 more clearly illustrates in cross-section the integral positioning of the ribs 16A, 16B relative to the hub 12 and blades 14. The blades 14 radiate outwardly from a central hub 12. The hub 12 has a hollow spool 24 encircled by a second hollow spool 26 of larger diameter. To those spools is attached a hub plate 28. As illustrated, the blades 14 radiate outwardly from and are integrally attached to the second hollow spool 26. Alternatively, the hub may be a spool-shaped solid core of material from which the blade 20 radiates.

FIG. 4 illustrates in more detail the hub arrangement illustrated in FIG. 2, in which an inner hollow spool 24 is encircled by a second hollow spool 26 of greater diameter. The blades 14 extend outwardly from the second hollow spool 26. A hub plate 28 covers the exposed ends of the spools 24 and 26.

In FIG. 2 individual ribs 16 are integrally attached to the laterally outer edge 21 of the blades 14 and are spaced apart 15 in relation to each other to inhibit insertion of small objects, such as fingers, between adjacent ribs 16A, 16B. At the distal end or outer tip 23 of the blades 14, the outer ribs 32A and 32B may be configured as a solid ring of material to provide reinforced strength to the flywheel 10. A collar 34 may be formed at the very tip 23 of the blades, thereby defining an outer edge of the flywheel 10 into which a resistance belt may be placed to resist movement of the flywheel 10.

FIG. 3 depicts the tip 23 of a blade 14 where the upper ribs 32A and 32B are configured as solid rings which form a continuous ring between each blade. The outer perimeter forms a solid collar 34 extending concentrically about the flywheel 10 to which each blade is attached. Recess 42 may receive a resistance strap, if desired. The solid collar 34 supports the blades 14 at their ends to minimize blade flutter and to stabilize the blades.

In operation, it may be noted that the ribs 16A, 16B, all rotate with the blades 14 and. Thus the enclosure 11 itself is rotated. If one were to touch the rotating ribs, such as ribs 16A, 16B, the frictional contact between the fingers and ribs tends to rotate the finger, other body part or an object. Upon rotation, the finger, body part or object is in effect flung away with minimal injury or damage and with little opportunity to contact the interior blades. Even if contact is made with the blade 14, there is no enclosure to hold the finger, body part or object stationary and thereby impose shearing forces and in turn injury or damage. With a stationary enclosure and rotating blades therein, a finger, body part or other object inserted through the enclosure is held stationary by the enclosure. The rotating interior blades therefore impose a shearing force on the finger or object which is being held stationary by the enclosure.

The illustrated embodiments of FIGS. 1 through 4 are representative of the principles of the invention and are not intended to limit the scope of the invention as claimed below.

What is claimed is:

1. A flywheel comprising:
    a hub having an axis of rotation;
    a plurality of blades each having outer edges positioned opposite one another in a lateral direction, a proximal end and a distal end, said proximal end being secured to said hub and said distal end being positioned radially away from said hub;
    enclosure means secured to said blades for passing air to said blades and preventing contact between said blades and foreign objects; and
    a collar secured proximate said distal ends of said blades.

2. The flywheel of claim 1 wherein said enclosure means includes a plurality of ribs radiating in a radial direction from said hub, and positioned to be spaced apart.

3. The flywheel of claim 1 wherein said enclosure means includes a plurality of ribs which are spaced apart rings substantially concentrically oriented relative to said hub.

4. The flywheel of claim 2 wherein said ribs are secured to said hub.

5. The flywheel of claim 3 wherein said plurality of ribs are secured to said blades.

6. The flywheel of claim 2 wherein said plurality of ribs are formed to be secured to at least one of said plurality of blades.

7. The flywheel of claim 5 or 6 wherein said plurality of ribs are positioned apart a distance from about one millimeter to about one centimeter.

8. The flywheel of claim 2 wherein said solid collar is positioned at said distal ends of said blades, and wherein at least one of said plurality ribs proximately the distal ends of said plurality of blades is configured to extend between said outer edges and to extend circumferentially as a continuous ring between each of said blades.

9. The flywheel of claim 2 wherein said ribs are secured to said hub to extend in a radial direction.

10. The flywheel of claim 9 wherein said ribs are spaced apart a distance selected to inhibit insertion of a user's fingers.

11. A flywheel for use in a stationary exercise machine, said flywheel comprising:
    a hub rotatably mounted to said stationary exercise machine for rotation with respect to said stationary exercise machine, said hub having a radial direction;
    a plurality of blades for providing resistance to said rotation, each said blade having a transverse direction, a proximal end, a distal end, and outer edges positioned opposite each other in said transverse direction, said proximal end being secured to said hub and said distal end being positioned away from said hub a distance in a radial direction;
    a plurality of ribs for enclosing said blades, said ribs forming rings spaced apart in a radial direction, and being secured to said blades to be concentric with respect to said hub; and
    a solid collar secured to said distal ends of said blades.

12. A flywheel for use in a stationary exercise machine, said flywheel comprising:
    a hub rotatably mounted to said stationary exercise machine for rotation with respect to said stationary exercise machine;
    a plurality of blades secured to and extending outwardly from said hub to provide air resistance upon said rotation of said blades, each said blade having a distal end;
    a plurality of ribs spaced apart from each other for enclosing said blades, said ribs being substantially circular, positioned substantially concentrically relative to said hub, and secured to said blades; and
    a solid collar secured about said distal ends of said blades, said collar having a recess formed therein for receiving a resistance belt.

13. A flywheel comprising:
    a hub configured for rotation about an axis;
    a plurality of blades configured to resist said rotation of said hub, each of said blades having a proximal end secured to said hub, a distal end positioned radially away from said hub, and outer edges positioned opposite each other in a lateral direction to extend between said proximal end and said distal end;
    enclosure means secured to said blades to rotate therewith for restricting foreign objects from contacting said blades and for conducting air to the blades; and
    a collar secured to at least two of said plurality of blades at said distal ends thereof.

14. A flywheel for rotating in a stationary exercise machine, said flywheel comprising:
    a hub mounted to said stationary exercise machine for rotating with respect to said exercise machine about an axis, said hub having a radial direction;

a plurality of blades configured to resist rotation of said flywheel, each said blade having a proximal end positioned proximate said hub to move with said hub, a distal end extending away from said hub, and outer edges positioned opposite each other in a lateral direction;

a plurality of ribs for enclosing said blades in a lateral direction, said ribs being concentrically spaced apart in a radial direction and secured to said each of said outer edges of said blades; and a solid collar secured to at least two of said plurality of blades at said distal ends of said blades.

* * * * *

UNITED STATES PATENT AND TRADEMARK OFFICE
CERTIFICATE OF CORRECTION

PATENT NO. : 5,203,826
DATED : 4/20/93
INVENTOR(S) : William T. Dalebout

It is certified that error appears in the above-indentified patent and that said Letters Patent is hereby corrected as shown below:

In Column 1, line 64, after "invention" insert --shown in--;

In Column 1, line 66, after "the" insert --invention--;

In Column 2, line 59, change "20" to --14--;

In Column 2, line 66, after "2" insert a comma;

In Column 2, line 67, after "laterally" insert --, also called transversely--;

In Column 3, line 2, before "outer" insert --radially--;

In Column 3, line 6, change "an" to --a radially--;

In Column 3, line 20, delete "and";

In Column 3, line 21, after "ribs" insert --16--.

Signed and Sealed this

Eighth Day of February, 1994

*Attest:*

BRUCE LEHMAN

*Attesting Officer*   Commissioner of Patents and Trademarks